United States Patent [19]

Powell

[11] 4,319,343
[45] Mar. 9, 1982

[54] PROGRAMMABLE DIGITAL MEMORY CIRCUIT

[75] Inventor: Robert W. Powell, North Wales, Pa.

[73] Assignee: Honeywell Inc., Minneapolis, Minn.

[21] Appl. No.: 169,307

[22] Filed: Jul. 16, 1980

[51] Int. Cl.³ .............................................. G11C 11/40
[52] U.S. Cl. .................................... 365/189; 365/104
[58] Field of Search ................. 365/189, 103, 104, 63, 365/230

[56] References Cited

U.S. PATENT DOCUMENTS 4,048,626 9/1977 Fett ..................................... 365/104

Primary Examiner—Terrell W. Fears
Attorney, Agent, or Firm—Laurence J. Marhoefer; Lockwood D. Burton; Mitchell J. Halista

[57] ABSTRACT

A programmable digital memory circuit uses a programmable read only memory (PROM) to correct code errors and permit expansion to additional PROM chips. Each code correction or expansion is made via enabling a portion of an overlay patch programmable read only memory (PROM) for a similar portion of the memory circuit at an address code burned into the overlay trap (PROM). Initially the overlay trap PROM is unprogrammed, and each bit location therein can act as an enable/disable selection to a 32 byte block in the overlay patch PROM. When a bit in the overlay trap PROM is programmed and when the memory address selects that location, the main memory is unselected and the patch PROM location is selected, i.e., substituted. The 256 bit locations in the overlay trap PROM can select 256 32 byte patches in the patch PROM for substitution in the main memory. Each patch may be added simply by burning one more location in the overlay trap PROM and inserting the corrected code data into the overlay patch PROM at the corresponding location. In addition to the overlay capability, the memory circuit allows each integrated circuit (IC) memory chip socket on a printed circuit broad to be individually configured to any of a number of memory chip types. Memory address bits are decoded by a "mapping" PROM which is programmed to select any one of the sockets in a memory array and to concurrently configure two electrical connections which are common to all of the chip sockets to properly enable the memory chip in the selected socket. This allows multiple types of integrated circuit (IC) memory chips can be used with an individual selection without the need of physical changes in the layout of the printed circuit card supporting the chips.

6 Claims, 1 Drawing Figure

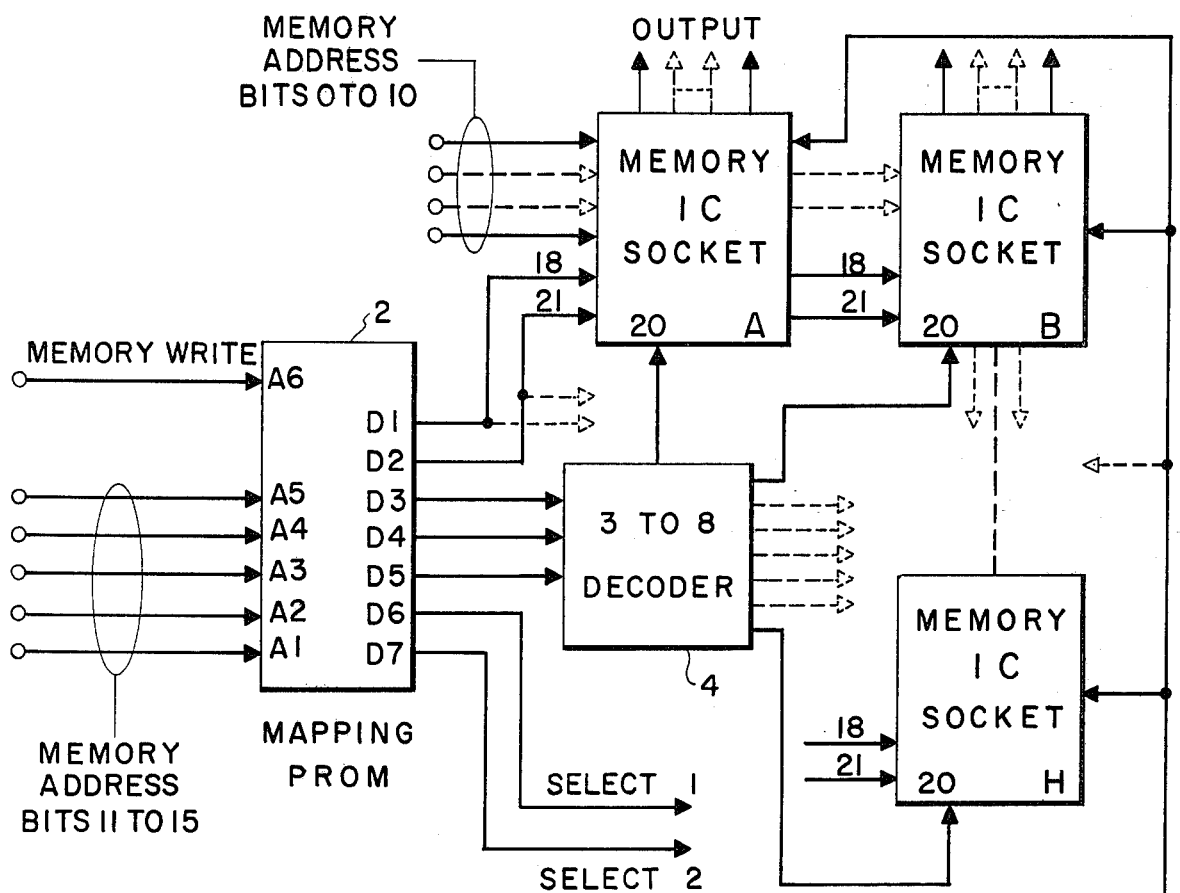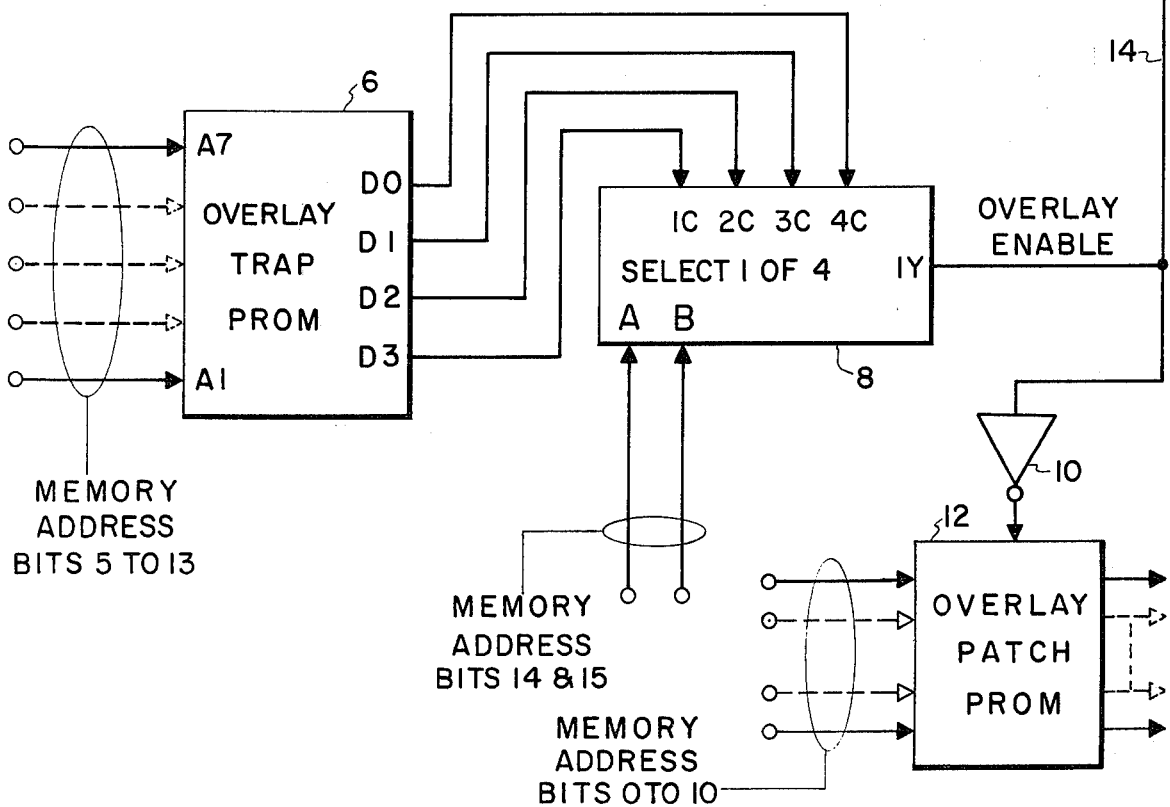

PROGRAMMABLE DIGITAL MEMORY CIRCUIT

BACKGROUND OF THE INVENTION

1. Field Of The Invention

The present invention relates to digital computer memories. More specifically, the present invention is directed to a selection circuit for programming digital computer memory circuits.

SUMMARY OF THE INVENTION

An object of the present invention is to provide a novel programmable digital memory circuit for enabling memory circuit selection and data substitution in digital computer memory circuits.

In accomplishing this and other objects, there has been provided, in accordance with the present invention, a programmable memory circuit having a plurality of read only memories and a digital storage means having addressable storage locations. A circuit means applies sequential memory addresses in parallel to the memories and the storage means while control signal means responds to the memory addresses to concurrently enable and disable either the memories or the storage means.

BRIEF DESCRIPTION OF THE DRAWING

A better understanding of the present invention may be had when the following detailed description is read in connection with the accompanying drawing, in which the single figure is a block diagram of a programmable digital memory circuit embodying an example of the present invention.

DESCRIPTION OF THE PREFERRED EMBODIMENT

1. Detailed Description

Referring to the single figure drawing in more detail, there is shown a block diagram of a programmable digital memory circuit embodying an example of the present invention for selecting ones of a plurality of read only memory (ROM) chips. The ROM chips are inserted into respective memory sockets A through H on a printed circuit card to form a first memmory bank, such memory chips and sockets being well-known in the art. A first group of memory address bits 0 to 10 from any suitable memory address circuit (not shown) for reading the data stored in a memory bank are connected in parallel to corresponding address input pins on each of the memory sockets A through H and to a first programmable read only memory identified as a mapping PROM 2. The PROM 2 is also supplied on inuts A1 through A6 with a second group of memory address bits 11 through 15 and a memory write signal on input A7. The outputs of the mapping PROM 2 selected by address bits 11 to 15 on output lines D1 through D7 are used to select the memory socket to be utilized. Specifically, output lines D1 and D2 are applied to pins 18 and 21 on each of the sockets A through B as socket selection signals. Output lines D3, D4 and D5 are applied to a three to eight decoder 4 used to decode the status of the digital signals on the three lines D3, D4 and D5 to ones of a plurality of eight output lines applied to respective ones of the sockets A through H on pin 20 of each of the sockets A through H. The output lines D6 and D7 from the mapping PROM 2 are used to select among memory banks with each memory bank having a group of the IC sockets similar to those shown as sockets A through H.

Memory address bits 5 through 13 are also applied to the address inputs of a second programmable read only memory identified as an overlay trap PROM 6. The outputs $D_0$, $D_1$, $D_2$ and $D_3$ from the overlay trap PROM 6 selected by the address bits 5 to 13 are applied to respective inputs 1C, 2C, 3C and 4C of a select 1 of 4 circuit 8. Memory address bits 14 and 15 are applied to respective inputs A and B of the select 1 of 4 logic circuit 8. An output from the logic circuit 8 on input 1Y is used as an overlay enable signal and is applied through an inverter 10 to an overlay patch PROM 12 and to each of the memory sockets A through H on signal line 14 to an enable input terminal. The "3 to 8 decoder 4" and the select 1 of 4 circuit 8 are devices which are well-known in the art and are available as integrated circuit chips.

2. Mode Of Operation

The memory address bits 0 to 10 are applied to all of the memory integrated circuit sockets A through H to effect a memory ready operation from the memory chips of the ROMS plugged into the sockets A to H. The output from a memory chip however is determined by the combination of additional output signals from the mapping PROM 2 and the three to eight decoder 4 which combination enables a specific memory chip in the sockets A to H to be selected. Specifically, the memory address bits 11 to 15 are applied to inputs A1 through A5 of the mapping PROM 2 while a memory "write" signal is applied to enable input A6 of the mapping PROM 2 to be used when a random access memory chip is used in any of the sockets A to H. The mapping PROM 2 has output signals on outputs D1 through D7 which are produced as a result of the memory address bits 11 through 15 and the memory write signal. The outputs D1 and D2 are applied in parallel to all of the memory sockets A through H on pins 18 and 21. However, the outputs D1 and D2 are configured or selected for each memory address to be applicable to the one of the memory chips in the sockets A through H selected by the outputs D3 to D5 whereby all of the other memory chips would be non-responsive thereto.

The outputs from the mapping PROM 2 shown as outputs D3, D4, and D5 are applied to a three to eight decoder 4 which is effective to produce an output signal on one of eight output lines in response to combination of the three input signals applied thereto. These output lines are applied to the enable input 20 of each of the memory sockets A through H. Thus, only the desired one of the primary chips in one of the sockets A through H is enabled by an output signal on one of the output lines from the three to eight decoder 4. The outputs D6 and D7 from the mapping PROM are used to select banks of memory chips. Thus, in the illustrated example, each memory bank would have eight memory sockets A through H, and the select one and select two signals from the outputs D6 and D7, respectively, of the mapping PROM 2 would be configured to select one of four banks of memory IC sockets, i.e., a selection of eight memory sockets from a total of 32 memory sockets available in the memory system. Thus, the memory address bits 0 to 10 are applied to all of the memory chips of the read only memories, however, only the memory chip selected by the mapping PROM 2 is effective to produce an output signal on the output lines from the memory socket. Thus, the circuit can use many different types of memory chips (ROMS) without altering the physical layout of the printed circuit board by assigning to each data byte in the mapping PROM both the socket address of where the memory chip being accessed is located and the correct configuration of the pins 18 and 21 on the socket having the memory chip desired. Since pins 18 and 21 on the most popular memory chips are the only pins that differ in configuration between chip types, the selection of these pins independently per socket allows many different types of memory chips to be located concurrently on a printed circuit board without the necessity of having all the memory chips be of an identical type.

In order to either correct the firmware code errors or permit expansion of firmware memory read only memory (ROM) chips, an overlay patch PROM 12 is used to substitute information stored in the overlay patch PROM 12 for information requested from various locations in the memory chips used in the memory sockets A through H. Thus, code corrections are made by overlaying a portion of the overlay patch PROM 12 at an address code which is found in an overlay trap PROM 6. Initially, the overlay trap PROM 6 is unprogrammed whereby all locations are logical lows. Each bit location in the overlay trap PROM 6 can act as an enable/disable selection for a 32 byte data block in the overlay trap PROM. When a bit location in the overlay trap PROM is previously programmed, i.e., converted to a logical high, and when the memory address bits 0 to 10 select that location in the main firmware memory of the sockets A through H, the main firmware is disabled by the signal on the overlay enable line 14 which signal concurrently enables the patch PROM 12 through the logic invertor 10 and the information in the patch PROM 12 is selected by the address bits 0 to 10 and substituted therefore. Since there are 256 bit locations in a typical overlay trap PROM 6 there are 256 32 byte patches from the patch PROM 12 which may be substituted for the main firmware memory data. Each data patch may be added simply by coding one more location in the overlay trap PROM 6 and inserting the corrected firmware code into the overlay patch PROM 12. The memory address bits 5 to 13 and 14 to 15 are used in a combination of the overlay trap PROM 6 and the select one of four circuit 8 to develop an enable signal on line 14 for the overlay patch PROM 12 to provide substitute data for a location in one of the memory chips in the sockets A through H. The first five memory address bits 0 to 4 are not used for the trap PROM 6 addresses since the patches are in 32 byte lengths whereby the first five address bits can be ignored $2^5=32$. Such a system is designed specifically to facilitate program changes, error connections and expansions of firmware. This facilitates the progress of a program memory development to be advanced to a so-called masked ROM at an early stage on a program design project and eliminates the need to fill memory bank sockets A to H with more expensive reprogrammable versions of the memory chips whenever a growth is expected in the firmware design.

Accordingly, it may be seen that there has been provided, in accordance with the present invention, an improved memory programming circuit for providing memory selection independent of memory chip type and substitution of information at locations within any of the memory chips. While the example utilizes a direct disable of memory chips, if such a disable function is not available at the chip, then the disable function can be attained by disabling the 3 to 8 decoder 4 when the patch PROM 12 is enabled and vice versa.

The embodiments of the invention in which an exclusive property or privilege is claimed are defined as follows:

1. A digital memory programming circuit comprising:
   a plurality of read only memory means for storing digital data at addressable locations therein,
   digital data storage means for storing digital data at addressable locations therein,
   circuit means for applying sequential memory addresses in parallel to all of said read only memory means and said data storage means,
   control signal means for producing an enable signal for said read only memory means and a disable signal for said digital data storage means in a first operative state and a disable signal for said read only memory means and an enable signal for said digital data storage means in a second operative state in response to an address operation by said memory address of said read only memory means, said control signal means switching between said first and second operative state for predetermined ones of said memory addresses.

2. A memory programming circuit as set forth in claim 1 wherein said digital data storage means includes a read only memory.

3. A memory programming circuit as set forth in claim 1 wherein said control signal means includes a read only memory addressed by said memory addresses and having stored therein at said addressable locations data representative of a desired switching between said first and second operative states and signal select means responsive to said last mentioned read only memory and to a preselect portion of said memory addresses to produce said enable and disable signals.

4. A memory programming circuit as set forth in claim 1 and further including means responsive to a second portion of said sequential memory addresses to produce an enable select signal for enabling a selected one of said plurality of memory means.

5. A memory programming circuit as set forth in claim 4 wherein said means responsive to a second portion includes a second read only memory means having digital data stored at addressable locations therein and decoder means responsive to said second read only memory means to produce said enable select signal.

6. A memory programming circuit as set forth in claim 4 wherein said enable select signal has a first part for selecting one of said plurality of read only memory means and second part for enabling a selected one of said read only memory means to respond to said memory addresses to access data at said addressable locations.

* * * * *